United States Patent
Neuman

(10) Patent No.: US 8,275,031 B2
(45) Date of Patent: Sep. 25, 2012

(54) SYSTEM AND METHOD FOR ANALYZING MULTIPLE DISPLAY DATA RATES IN A VIDEO SYSTEM

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1992 days.

(21) Appl. No.: 11/304,281

(22) Filed: Dec. 15, 2005

(65) Prior Publication Data

US 2007/0139425 A1  Jun. 21, 2007

(51) Int. Cl.
- G06F 3/038 (2006.01)
- G06F 3/00 (2006.01)
- G09G 1/14 (2006.01)
- G09G 1/02 (2006.01)
- G09G 5/00 (2006.01)
- G06T 15/00 (2011.01)
- H04N 5/46 (2006.01)
- H04N 5/225 (2006.01)
- H04N 7/01 (2006.01)
- H04N 11/04 (2006.01)

(52) U.S. Cl. ............ 375/240; 345/208; 345/23; 345/27; 345/419; 345/660; 345/558; 345/220.1; 345/445; 715/718

(58) Field of Classification Search .................. 375/240; 345/1.1, 208, 23, 27, 419, 660, 33; 348/558, 348/220.1, 445; 715/718
See application file for complete search history.

(56) References Cited

U.S. PATENT DOCUMENTS

| | | | | |
|---|---|---|---|---|
| 3,801,961 A * | 4/1974 | Coombe | ............... | 345/23 |
| 3,829,838 A * | 8/1974 | Lewis et al. | ............... | 345/419 |
| 5,537,150 A * | 7/1996 | Sugiyama et al. | ............... | 348/558 |
| 5,929,924 A * | 7/1999 | Chen | ............... | 348/552 |
| 6,141,059 A * | 10/2000 | Boyce et al. | ............... | 348/565 |
| 6,556,594 B2 * | 4/2003 | Uchide | ............... | 370/537 |
| 6,642,935 B1 * | 11/2003 | Soga | ............... | 345/660 |
| 6,831,617 B1 * | 12/2004 | Miyauchi et al. | ............... | 345/33 |
| 6,941,382 B1 * | 9/2005 | Tuli | ............... | 709/247 |
| 7,098,868 B2 * | 8/2006 | Love et al. | ............... | 345/1.1 |
| 7,262,746 B2 * | 8/2007 | Lagarrigue et al. | ............... | 345/1.3 |
| 2004/0160460 A1 * | 8/2004 | Casey et al. | ............... | 345/718 |
| 2006/0026302 A1 * | 2/2006 | Bennett et al. | ............... | 709/246 |
| 2008/0158212 A1 * | 7/2008 | Maruyama et al. | ............... | 345/208 |

* cited by examiner

*Primary Examiner* — Akwasi M Sarpong
(74) *Attorney, Agent, or Firm* — Thomas, Kayden, Horstemeyer & Risley LLP.

(57) ABSTRACT

Certain aspects of a system and method for handling video data may comprise determining data rates associated with each of a plurality of destination devices utilized for processing video data in a video processing system that supports multiple display data rates. A data rate associated with a first portion of the plurality of destination devices may be adjusted to match at least one data rate associated with one or more of a remaining portion of the plurality of destination devices in instances where the determined data rate of the first portion of the plurality of destination devices is greater than one or more data rate associated with one or more of the remaining portion of the plurality of destination devices.

24 Claims, 9 Drawing Sheets

SYSTEM AND METHOD FOR ANALYZING MULTIPLE DISPLAY DATA RATES IN A VIDEO SYSTEM

RELATED APPLICATIONS

This application is related to the following applications, each of which is hereby incorporated herein by reference in its entirety:

U.S. patent application Ser. No. 10/314,525 filed Dec. 9, 2002;

U.S. patent application Ser. No. 11/304,282 filed Dec. 15, 2005; and

U.S. patent application Ser. No. 11/300,782 filed Dec. 15, 2005.

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the present invention relate to processing video signals. More specifically, certain embodiments of the present invention relate to a method and system for analyzing multiple display data rates in a video system.

BACKGROUND OF THE INVENTION

Generally in video systems live video is captured and stored in memory, and fed into a video processing unit before being sent out for display on a video output device. Processing can involve such functions as, for example, scaling, compositing, and format conversion. Scaling can be horizontal and/or vertical, where scaling in one direction can involve increasing or decreasing the pixels per line, thus increasing or decreasing the size of an image and its format. Compositing can involve overlaying the video with a layer of graphics or text. Such processes may have an effect on the bandwidth of the memory of the system. For example, format conversions often cause an increase or decrease in the amount of memory required for capturing an input or an output into the memory. These processes affect the data rate in the system. If data rate is exceeded at any process in the system, problems arise and cause errors in the video flow.

One problem that is often encountered in video systems involves dual output videos. For example, one video source sometimes may need to be displayed on two different displays. The two displays in some instances are not the same, and some scaling and other processing is needed to display the video properly. Existing systems often do not support splitting one video source to be sent to different destinations. More specifically, sending the same video source to different destinations requiring different scaling factors is not supported by existing technology. As a result, when multiple destination devices are utilized for displaying a single video source, the video source has to send the video data multiple times, each time to a different one of the destination devices. In this regard, this is effectively equivalent to using multiple sources. Sending the video data multiple times is greatly inefficient and wasteful of system resources.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to handling video data in a video processing system that supports multiple display data rates and multiple display types. In accordance with various aspects of the invention, a system and method for processing information in a video system is provided and may comprise determining data rates associated with each of a plurality of destination devices utilized in the video processing system that supports multiple display data rates. A data rate associated with a first portion of the plurality of destination devices may be adjusted to match at least one data rate associated with one or more of a remaining portion of the plurality of destination devices in instances where the determined data rates of the first portion of the plurality of destination devices is greater than one or more data rate associated with one or more of the remaining portion of the plurality of destination devices.

Figure 1A:
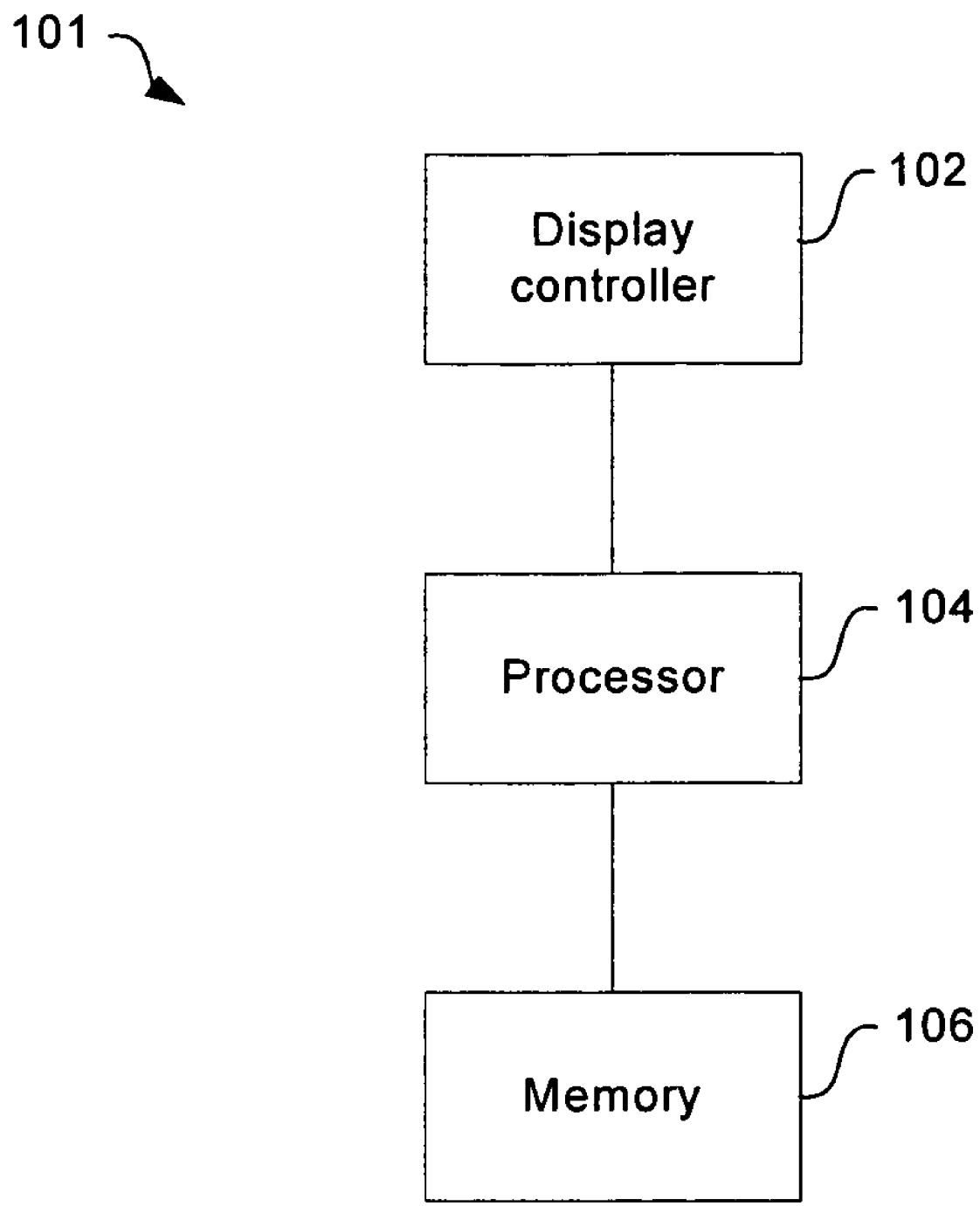
FIG. 1a illustrates a block diagram of an exemplary architecture for positioning of a display controller, in accordance with an embodiment of the present invention.

FIG. 1a illustrates a block diagram of an exemplary architecture for positioning of a display controller, in accordance with an embodiment of the present invention. Referring to FIG. 1a, the display system 101 may comprise a display controller 102, a processor 104, and a memory 106. The display controller 102 may comprise suitable logic, code, and/or circuitry that may be adapted to display video frames/fields. The display controller that may be utilized in a video network (VN). The display controller may be capable of accepting different inputs as video sources such as, for example, MPEG, VDEC, ITU-656, and HD-VDI sources. The processor 104 may comprise suitable logic, code, and/or circuitry that may be adapted to control the operation of the display controller 102 and to transfer control information and/or data to and from the memory 106. The memory 106 may comprise suitable logic, code, and/or circuitry that may be adapted to store control information, data, and information regarding video frames/fields.

Figure 1B:
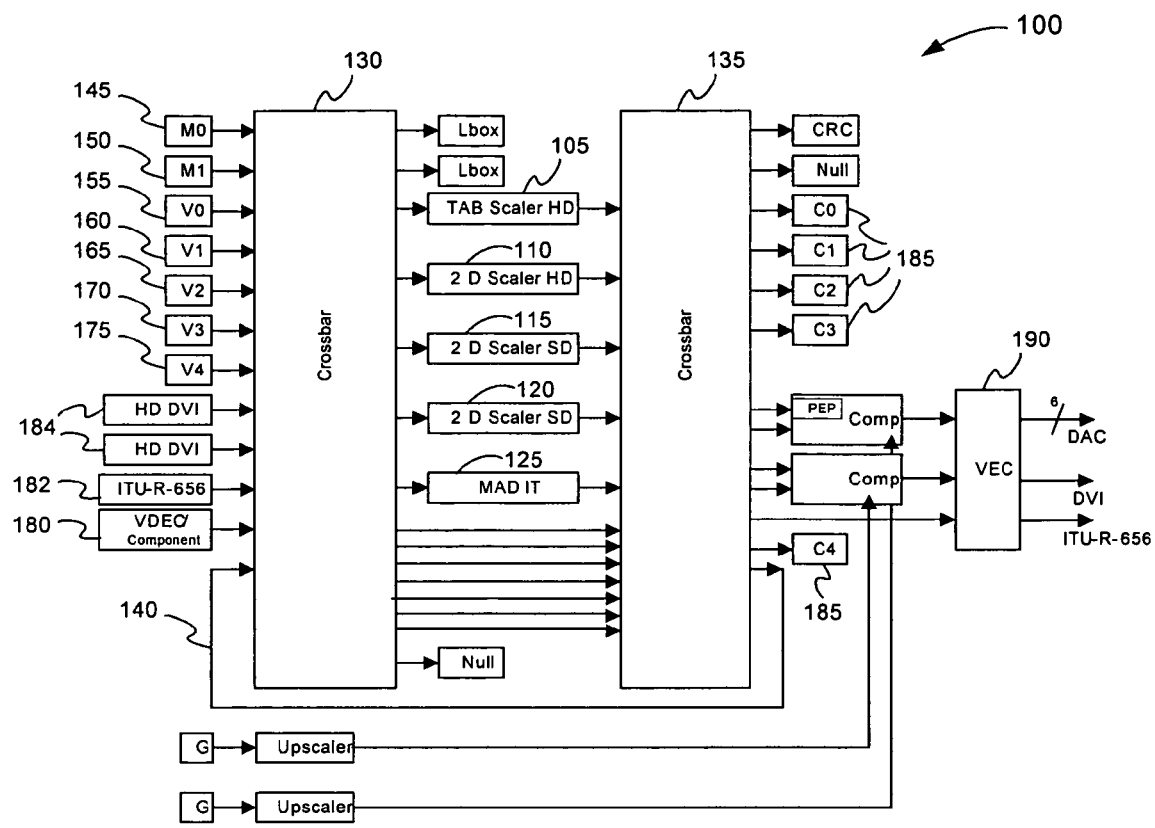
FIG. 1b illustrates a block diagram of an exemplary architecture of a display controller of FIG. 1a, in accordance with an embodiment of the present invention.

FIG. 1b illustrates a block diagram of an exemplary architecture of a display controller 100 of FIG. 1a, in accordance with an embodiment of the present invention. The display controller 100 may be clocked with a single clock, which may be, for example, a 108 MHz clock. A motion adaptive deinterlacer with inverse telecine 3:2/2:2 (MAD-IT) 125 along with a plurality of scalers (105, 110, 115, and 120), for example, may be positioned between a first crossbar 130 and a second crossbar 135. The first crossbar 130 may be referred to as an input crossbar and the second crossbar 135 may be referred to as an output crossbar.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

A feedback path 140 may be provided from the output of the second crossbar 135 to the input of the first crossbar 130. This may allow any of the standard definition (SD) video sources such as the MPEG feeders 145 and 150, video feeders 155, 160, 165, 170 and 175, and/or video decoder (VDEC) 180, and so on, to function as an input to the MAD-IT 125 and/or one of the scalers 105, 110, 115, and 120. The VDEC 180 may be an analog video decoder that may process NTSC signals to separate the chroma color components from the luma color components. The MPEG feeders 145 and 150 may accept 4:2:0 and 4:2:2 video data and supply 4:2:2 video data. The video feeders 155, 160, 165, 170 and 175, may accept 4:2:2 video data and supply 4:2:2 video data. The output of the second crossbar 135 may be passed back to the first crossbar 130 via the feedback path 140.

A scaler such as, for example, scaler 105, 110, 115, or 120, may contain a line buffer that stores a plurality of lines of pixels for vertical scaling. The scaler may have, for example, a line buffer of 4×1280 pixels. Such a line buffer may be reconfigurable and may as a result be used to alleviate the RTS bandwidth of different scaling scenarios. For example, to scale down a picture by four in the vertical direction, a vertical scaler may produce one line for every four input lines. A portion of the line buffer may be placed after the vertical scaler to spread the data burst across multiple lines; thus lowering the output bandwidth.

Pixels for incoming streaming video may be captured as 4:2:2 YCrCb, for example. Video sources may utilize video capture to store the source to memory. A capture to memory function may be utilized. Capturing to memory may allow sync-slip to produce correct output frame rates, because input sources may not always be frame accurate to tolerance needed for NTSC or PAL output. Additionally, input sources may require cropping and scaling that cannot be done directly from input to output, and picture-in-graphic (PIG) windows require availability of all input pixels in order to scale the output. Storing the pixels in memory may ensure appropriate handling of these functions. Furthermore, capturing to memory may ensure appropriate time shifting of input sources and vertical or horizontal shifting of an output window anywhere on the screen. The video capture functions may be performed by a capture engine and related functions, which may be found in capture blocks 185.

A video feeder such as, for example, video feeders 155, 160, 165, 170 and 175, may fetch pictures captured in the main memory. The MPEG feeders 145 and 150 may have the capability to support 4:2:0 to 4:2:2 conversions. Standard video feeders may be used to play captured video from live sources, or to playback captured video from scaled MPEG sources (PIG and PIP windows).

The VDEC 180, ITU-656 input 182 and HD-DVI input port 184 may be forms of video input ports, and may sample and format video data arriving at fixed clock rates into the device. The modules of the video input ports may provide format information to software, provide various sync mechanisms to time-base blocks, and provide error recovery mechanisms to make the system robust to various input errors. Video from the video input ports may be scaled then captured or captured directly.

The video encoder (VEC) 190 may be adapted to function as a primary video output for the video network. The VEC 190 may resample data, insert timing, blanking and sync information, and modulate chroma where necessary for NTSC and PAL outputs. The video output to the VEC 190 may be output by a video feeder directly or output by the video feeder, scaled, then sent to the VEC 190.

The display controller 100 may support several modes of display. Some exemplary display modes that may be supported by the display controller may comprise full screen (Full), picture-in-picture (PIP), and picture-in-graphic (PIG).

In the full display mode, an input stream may be displayed utilizing a whole screen. Some scaling may be used to match the display resolution and aspect ratio. For example, a 1080i input stream may be scaled to 704×180 per field for a NTSC display. Full screen may include letterbox conversion on 4:3 displays, pillarbox conversion on 16:9 displays, pan scan conversion on 4:3 displays, non-linear horizontal display, and anamorphic 16:9 output on 4:3 display.

Figure 2A:
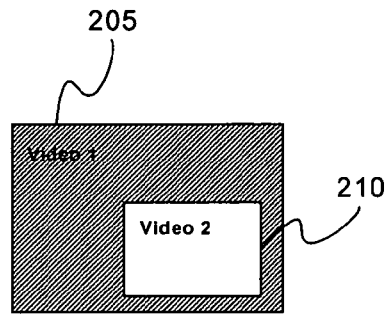
FIG. 2a illustrates an exemplary window PIP display, in accordance with an embodiment of the present invention.
Figure 2B:
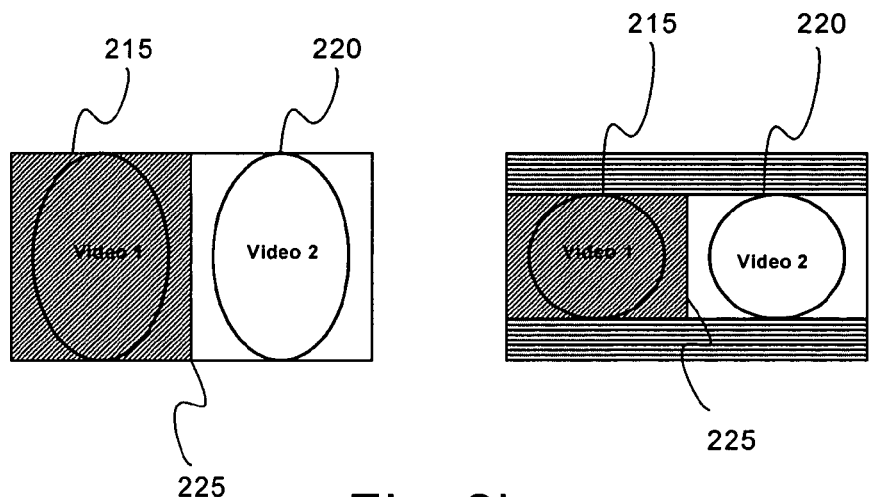
FIG. 2b illustrates an exemplary side-by-side PIP display, in accordance with an embodiment of the present invention.
Figure 2C:
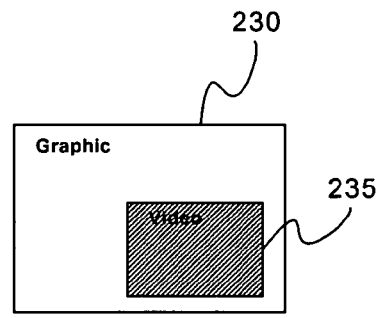
FIG. 2c illustrates an exemplary PIG display, in accordance with an embodiment of the present invention.

FIG. 2a illustrates an exemplary window PIP display, in accordance with an embodiment of the present invention. Referring to FIG. 2a, there is shown a window PIP that may comprise a full-screen input stream 205 and another windowed input stream 210. FIG. 2b illustrates an exemplary side-by-side PIP display, in accordance with an embodiment of the present invention. In the PIP mode, two video windows may be displayed on a screen. Referring to FIG. 2b, there is shown a side-by-side PIP that divides the viewing surface of a display into two regions 215 and 220 of the same size, sharing a common vertical boundary 225. Each region may be fully covered by an input stream (aspect ratio incorrect) or partially covered in letterbox format (aspect ratio correct). FIG. 2c illustrates an exemplary PIG display, in accordance with an embodiment of the present invention. Referring to FIG. 2c, for a PIG display mode, a display comprises a windowed input stream 235 and the rest of the viewing surface is covered by graphics 230.

In addition to the display modes, the display controller 100 may utilize different source modes for processing. Exemplary source modes may comprise full screen (Full) and cropped. In Full source mode, an input stream may be sourced utilizing a whole screen. Some scaling is required to match the display resolution and aspect ratio. For example, a 1080i input stream may be scaled to 704×180 per field for a NTSC display. In cropped source mode, an input stream may be sourced using only a portion of the screen. This may be done when the source is determined to be letterbox source, or pan-scan is selected. In either case, only a portion of the available source material may be selected for viewing.

Figure 3A:
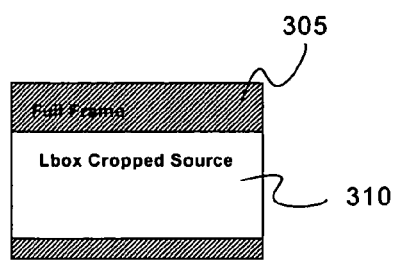
FIG. 3a illustrates an exemplary letterbox cropped source, in accordance with an embodiment of the present invention.
Figure 3B:
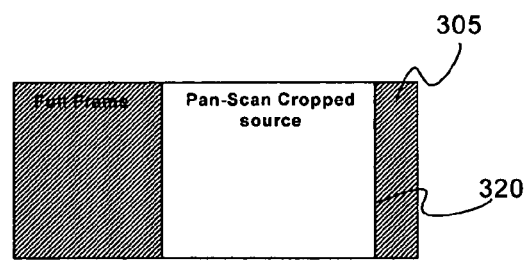
FIG. 3b illustrates an exemplary pan-scan cropped source, in accordance with an embodiment of the present invention.

FIG. 3a illustrates an exemplary letterbox cropped source, in accordance with an embodiment of the present invention. Referring to FIG. 3a, the letterbox cropped source may occupy a portion 310 of the full screen 305. FIG. 3b illustrates an exemplary pan-scan cropped source, in accordance with an embodiment of the present invention. Referring to FIG. 3b, the pan-scan cropped source may occupy a portion 320 of the full screen 305.

Figure 4:
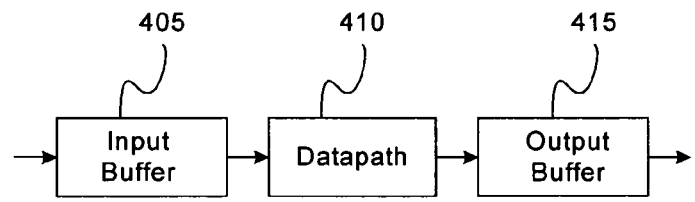
FIG. 4 illustrates a flow diagram of an exemplary display pipeline, in accordance with an embodiment of the present invention.

FIG. 4 illustrates a flow diagram of an exemplary display pipeline, in accordance with an embodiment of the present invention. Referring to FIG. 4, the display pipeline may comprise an input buffer 405, a datapath 410, and an output buffer 415. The input buffer 405 may convert a bursty input data stream into a steady supply for the datapath 410 to enhance its performance. The datapath 410 may be any processing of the video such as, for example, a scaler, a compositor, etc. The output buffer 415 may perform two functions. First, in instances where the result of the processing in the datapath 410 is written to the main memory, the output buffer 415 may be used as a staging area for memory writes. Second, in instances where the result of the processing in the datapath 410 is displayed directly, the output buffer 415 may be used to smooth the dataflow.

In an embodiment of the present invention, the datapath 410 may comprise processes that may alter the data rate such as, for example, video scaling. Inserting a video scaler in the display pipeline may alter the data rate in a per pixel basis during horizontal scaling and in a per line basis in vertical scaling. Therefore, where the process of scaling takes place may affect the bandwidth of the memory in the display controller.

Figure 5:
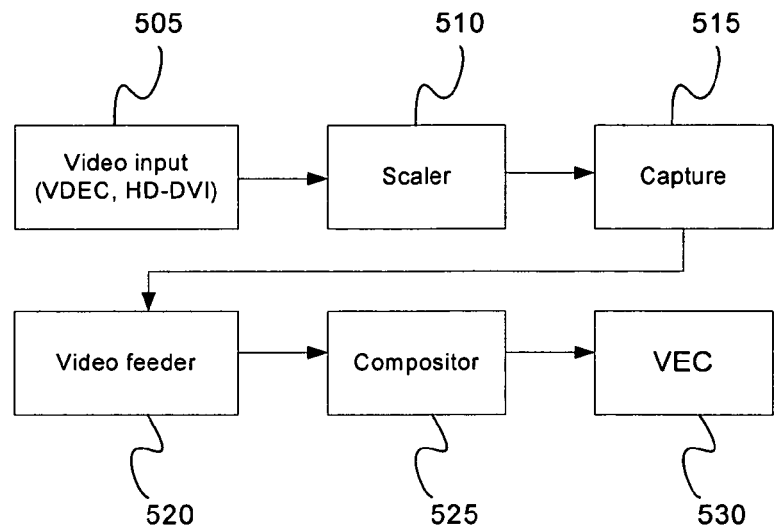
FIG. 5 illustrates a flow diagram of an exemplary dataflow with video input scaling-down, in accordance with an embodiment of the present invention.

FIG. 5 is a block diagram of an exemplary system that illustrates dataflow with video input scaling-down, in accordance with an embodiment of the present invention. Referring to FIG. 5, there is shown a video input 505, a scaler 510, a capture block 515, a video feeder 520, a compositor 525 and a VEC 530. The output of the video input block 505 may be coupled to an input of the scaler 510 and the output of the scaler 510 may be coupled to an input of the capture block 515. The output of the capture block 515 may be coupled to an input of the video feeder 520. An output of the video feeder 520 may be coupled to an input of the compositor 525 and an output of the compositor 525 may be coupled to an input of the VEC 530. In the configuration of FIG. 5, the scaler 510 precedes capture block 515.

The video input 505 may comprise an input video stream, which may be in any one of a plurality of video formats. The scaler 510 may comprise hardware, software, or a combination thereof that may be capable of scaling input video 505 horizontally and/or vertically. The capture block 515 may comprise functionality capable of capturing an input video from the scaler 510 to memory. The video feeder 520 may oversee feeding the captured scaled video from memory to further processing such as, for example, the compositor 525. The compositor 525 may comprise functionality that may apply a layer to the video such as, for example, graphics, text, etc. The VEC 530 may then encode the video stream according to the requirements of the system and in a manner appropriate for the intended video decoder and display on which the video may be displayed.

In an embodiment of the present invention, for PIP and PIG images, the incoming video is usually scaled down. Scaling may be performed before capturing the input video or after the video feeder. A scale factor change may occur in situations such as, for example, changing to PIG or PIP display mode. The display controller may switch the display mode to PIP display mode, where a PIP window may utilize large scale-downs. Such large scale-downs may consume large bandwidth if done after the video feeder. In such a case it may be more efficient to use a scheme of input-scale-capture-feed-VEC as illustrated by FIG. 5, where the video input 505 may be initially scaled 510, then captured to memory 515. As a result, feeder 520 bandwidth may be conserved. Further processing such as, for example, compositing 525 may then be applied and sent to VEC 530. When the scaling 510 is performed prior to capturing 515, the video feeder 520 bandwidth may only need to support the pixel rate of the output, which may be smaller than the original input video.

The decision to use the scheme illustrated by FIG. 5, i.e., scaling then capturing may be based on whether scaling down may be needed. If scaling down, then the aforementioned scheme may be used. However, the decision may be based on other factors as will be shown hereinafter. For simplicity however, the scheme illustrated by FIG. 5 may be referred to as scaledown-capture.

In an embodiment of the present invention, the display controller may be in cropped images display mode, where the incoming video may be scaled up. A small portion of video may be selected for scaling up to fill the entire video frame store. Cropped images may either come from small, cropped regions or from letterbox source material that is cropped vertically to store as full screen. While scaling may be performed before or after the capture buffer, cropped input images generally need scaling-up to full size. Capture and video feeder bandwidth may be relieved when the scaling up is done after the video feeder. As a result it may be more efficient to use a scheme of input-capture-feed-scale-VEC as illustrated by FIG. 6, where the video input 605 may be initially captured to memory 610, sent through the video feeder 615, then scaled 620.

Figure 6:
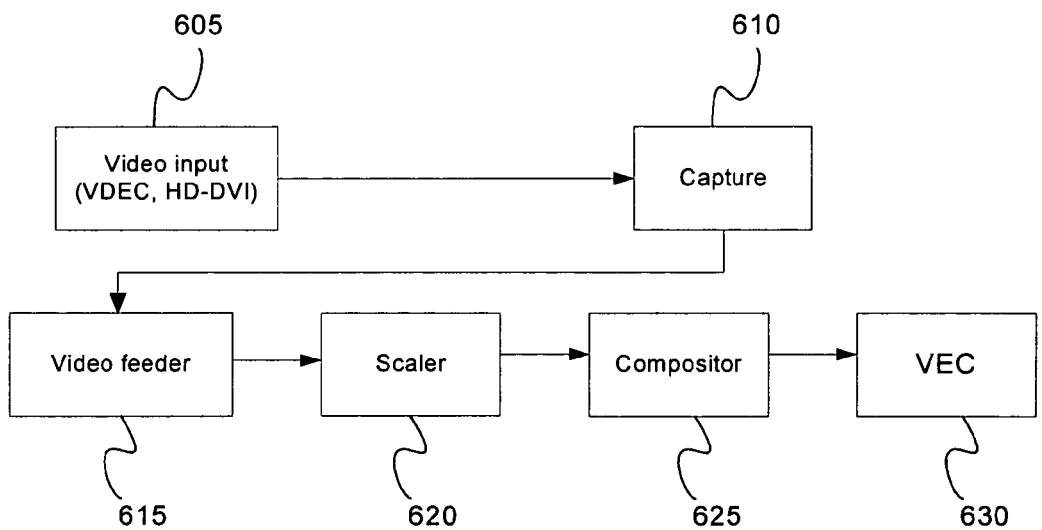
FIG. 6 illustrates a flow diagram of an exemplary dataflow with video input scaling-up, in accordance with an embodiment of the present invention.

FIG. 6 illustrates a flow diagram of an exemplary dataflow with video input scaling-up, in accordance with an embodiment of the present invention. Referring to FIG. 6, there is shown a video input 605, a capture block 610, a video feeder 615, a scaler 620, a compositor 625 and a VEC 530. An output of the video input block 605 may be coupled to an input of the capture block 610. An output of the capture block 610 may be coupled to an input of the video feeder 615 and an output of the video feeder 615 may be coupled to an input of the scaler 620. An output of the scaler 620 may be coupled to and input of the compositor 625 and an output of the compositor may be coupled to an input of the VEC 630. In the configuration of FIG. 6, the capture block 610 precedes the scaler 620.

In operation, the video input 605 may comprise an input video stream, which may be in any one of a plurality of video formats. The capture 610 may comprise functionality capable of capturing an input video from the input block 605 to memory. The video feeder 615 may oversee feeding the captured video from memory to blocks where further processing may be applied to the video such as, for example, scaling 620 and compositing 625. The scaler 620 may comprise hardware, software, or a combination thereof that may be capable of scaling input video horizontally and/or vertically. The compositor 625 may comprise functionality that may apply a layer to the video such as, for example, graphics, text, etc. The VEC 630 may then encode the video stream according to the requirements of the system and in a manner appropriate for the intended video decoder and display on which the video may be displayed.

The decision to use the configuration illustrated by FIG. 6, which comprises capturing preceding scaling may be based on whether scaling up may be needed. If scaling up, then the aforementioned scheme may be used. However, the decision may be based on other factors as will be shown hereinafter. For simplicity however, the scheme illustrated by FIG. 6 may be referred to as capture-scaleup.

The decision to use the scaledown-capture scheme over the capture-scaleup scheme and vice versa may be done at the video input. In one video stream, changes in the type of input and the display mode may trigger making a decision as to the order in which scaling and capturing may be done. One goal of this decision is to minimize the capture bandwidth versus the feeder bandwidth. One effect of such a decision may be storing the least amount of data in the capture-playback buffers. In this regard, if the bandwidth for the scaledown-capture scheme is less than the bandwidth for the capture-scaleup, then scaledown-capture may be chosen, and vice versa. Making this decision may be achieved by comparing a scaledown-capture bandwidth estimate with a capture-scaleup bandwidth estimate.

The following simple approximation may be utilized to determine the scaledown-capture bandwidth estimate at the capture:

$$I_{out} = O_x \times O_y, \quad (1)$$

where $I_{out}$ may be the output scaled image size, $O_x$ the image output x dimension and, $O_y$ the image output y dimension. Then the capture time, CaptTime may be calculated as follows:

$$CaptTime = \frac{Iline}{Iclk} \times Iy, \quad (2)$$

where Iline may be the input line samples per horizontal line (including hblank), Iclk the input pixel clock, and $I_y$ the image input y dimension. The estimate of the scaledown-capture bandwidth may then be:

$$I_{BW} = \frac{I_{Out}}{CaptTime}. \quad (3)$$

Similarly, the following approximation may be utilized to determine the capture-scaleup bandwidth estimate at the video feeder:

$$I_{in} = I_x \times I_y, \quad (4)$$

where $I_{in}$ may be the input scaled image size, $I_x$ the image input x dimension, and $I_y$ the image input y dimension. Then the feeder time, FeedTime may be calculated as follows:

$$FeedTime = \frac{Oline}{Oclk} \times Oy, \quad (5)$$

where Oline may be the output line samples per horizontal line (including hblank), Oclk the output pixel clock, and $O_y$ the image output y dimension. The estimate of the capture-scale up bandwidth may then be:

$$O_{BW} = \frac{I_{In}}{FeedTime}. \quad (6)$$

The decision is then made as follows: if the scaledown-capture bandwidth is larger than the capture-bandwidth then the best choice may be to perform capture prior to scale up. If the opposite is true, then the best choice may be to perform scaledown prior to capture.

In this regard, the decision may be determined as followed:

$$I_{BW} > O_{BW} \quad (7)$$

If this decision is true, then bandwidth may be conserved through capture-scaleup, where capture may run at the input pixel rate, and scaleup occurs after the video feeder as shown in FIG. 6. On the other hand, if this decision is false, then bandwidth may be conserved through scaledown-capture, where video feeder may run at the output pixel rate, and scaledown occurs before the video feeder as shown in FIG. 5. Therefore, the overall system bandwidth may be optimized by choosing how to crop/scale and capture/playback video. Performing such decisions may allow arbitrary cropping and scaling on video inputs without hitting cases of extreme bandwidth.

This approach to cropping, scaling, capture and playback may save significant bandwidth. A large degree of flexibility to the user for cropping images to different sizes without encountering bandwidth constraints may be allowed with the system described herein. This system may be general enough to scale to any image size and pixel rate.

In an embodiment of the present invention, different combinations of input and output formats may be examined to determine the associated data rates. Since the video system may have a maximum clock rate that may not be exceeded, testing different combinations of input and output formats may ensure keeping the system data rate below the maximum rate. For each combination of an input and output video format, the impact on capture, feeder, and scaler inputs may be determined. For each combination the scaledown-capture and capture-scaleup schemes may be examined as well. A capture rate associated with the different combinations may then be determined. As a result, for each combination, all the possible data paths may be examined to determine the capture rates that would ensure that the hardware does not exceed the maximum allowed pixel clock rates. Each combination may be also examined taking into consideration a 1% oscillation test used with the capture-scale ordering as described hereinabove, and described in more detail in incorporated U.S. patent application Ser. No. 11/300,282 filed Dec. 15, 2005.

In an embodiment of the present invention, different combinations of input and output formats may be examined to determine the associated data rates. Since the video system may have a maximum clock rate that may not be exceeded, testing different combinations of input and output formats may ensure keeping the system data rate below the maximum rate at all times. Results of analyzing different combinations of input and output video formats and processing activities between the input and output may be utilized to determine an optimal capture and video feeder operations such that the maximum data rate of the system is not exceeded. This method is described in incorporated U.S. patent application Ser. No. 11/304,282 filed Dec. 15, 2005.

Setting the capture and video feeder at optimal values may allow such operations as, for example, cropping or PIP, with any video format input and any display format out of a video system. All combinations of input and output formats, scaling factors, display modes, etc., may utilize a single, optimal value for memory bandwidth for capture and video feed as determined by the testing of the different combinations. As a result, the memory bandwidth needs of the system may be disassociated from the software usage of the video processing (scaling, cropping, etc.), which as a result, may simplify the system design, and optimize memory bandwidth.

Figure 7A:
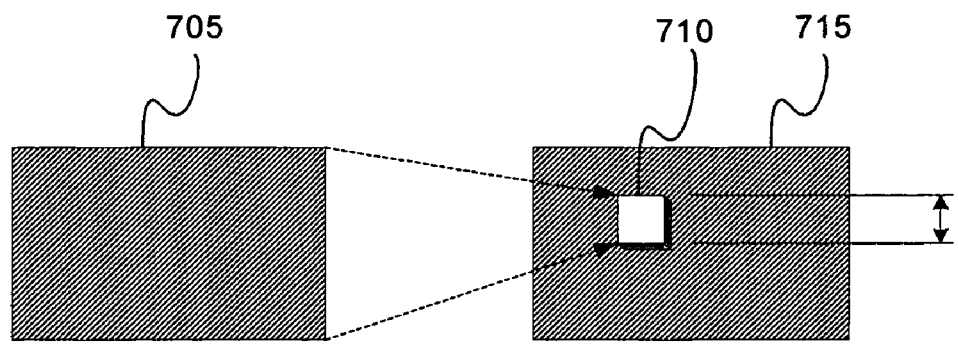
FIG. 7a illustrates an exemplary PIP or PIG, in accordance with an embodiment of the present invention.
Figure 7B:
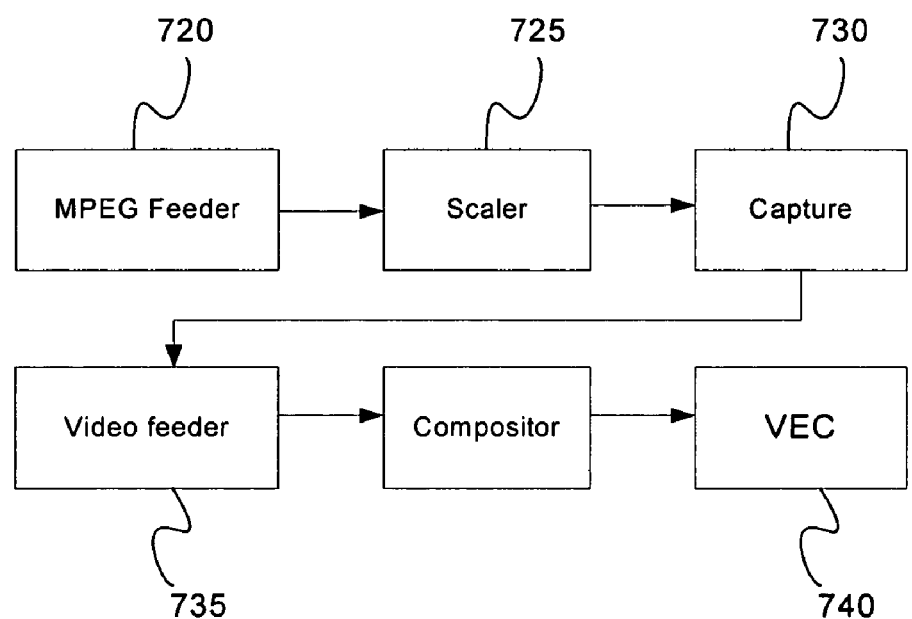
FIG. 7b illustrates an exemplary MPEG PIP/PIG data flow, in accordance with an embodiment of the present invention.

FIG. 7a illustrates an exemplary PIP or PIG, in accordance with an embodiment of the present invention. A MPEG (graphic) frame 705 may be scaled down to a smaller size frame, PIP (PIG) 710 to be displayed on an output frame 715. The PIP (PIG) 710 may have smaller time than the time for the frame 715. For example, the PIP (PIG) 710 may be 1/16 the size of the MPEG frame 705, and may use 1/4 the time for the frame 715. Therefore, to avoid scanning the PIP (PIG) 710 at a rate that is 4 times the scan out rate from memory, the data flow illustrated by FIG. 7b may be utilized such that the entire source 705 may be scanned out from the MPEG feeder 720 within one frame time. The scanned out frame may then be processed by the scaler 725, and captured (as a smaller frame) by the capture process 730 within one frame time. As a result, at the video feeder 735, the data may be already at an appropriate size such that the pixels may feed to the VEC 740 at the appropriate pixel rate.

FIG. 8 illustrates an exemplary MPEG dual display data flow, in accordance with an embodiment of the present invention. The dual display functionality may use a single MPEG Feeder 805 to drive two outputs: a HD output 820 (which may be any format including NTSC or PAL) and a SD output 845 (which may be 480i or 576i). A single MPEG feeder 805 may be utilized, which may simplify the system and conserve bandwidth.

The video for the SD display may go through a capture-playback sync slip buffer to provide for the frame rate restrictions on NTSC and PAL outputs. The capture-playback buffer may also be used to scale the output to any size on the secondary. This may, for example, be done for full screen secondary (VCR output mode), or can be for PIP/PIG windows on the secondary. Because the HD display may be driven directly by the MPEG feeder 805 and through a path comprising a scaler 810, compositor 815, and VEC 820, the system may operates correctly when the SD capture 830 is scheduled with enough bandwidth to prevent interference at the output of the MPEG feeder 805. To ensure that the system operate correctly, the SD capture rate and SD scaler rate may be increased until the incoming rate $R_{SCALE-CAPT}$ 850 matches the direct feed rate $R_{HD}$ 855.

Analysis may be done for all input sources and output sizes, including dual displays. In an embodiment of the present invention, the analysis may be done by software. The analysis may yield a worst case of combination of input and output displays, wherein the bandwidth is at its worst for the system. In an embodiment of the present invention, the worst case of bandwidth may occur when the HD output 820 is a 4:3 letterbox output (like 480p or VESA modes) and the secondary is output full screen (either anamorphic or pan-scan). In this exemplary scenario, the entire image time on the VEC HD output is 3/4 of the frame time, and the resulting bandwidth at the SD Capture must capture an entire SD frame in 3/4 frame time to prevent the SD capture path from being a bottleneck in the system. In this case, the SD capture must run at (4/3)×13.5 Mhz, or 18 Mhz.

Figure 8A:
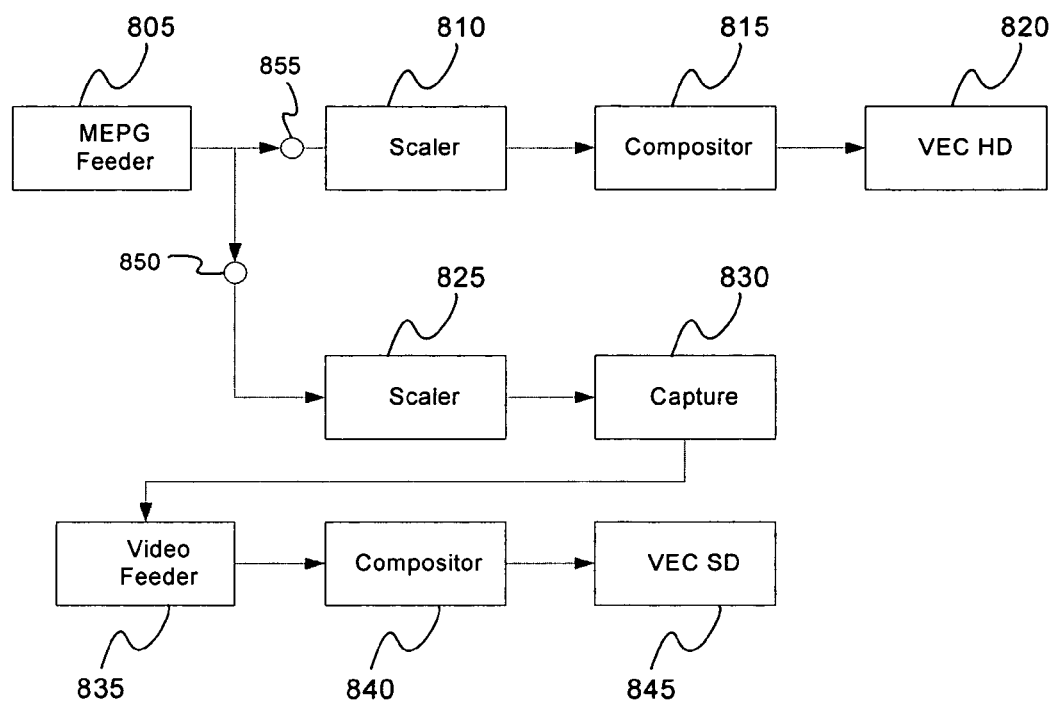
FIG. 8a illustrates an exemplary MPEG dual display data flow, in accordance with an embodiment of the present invention.
Figure 8B:
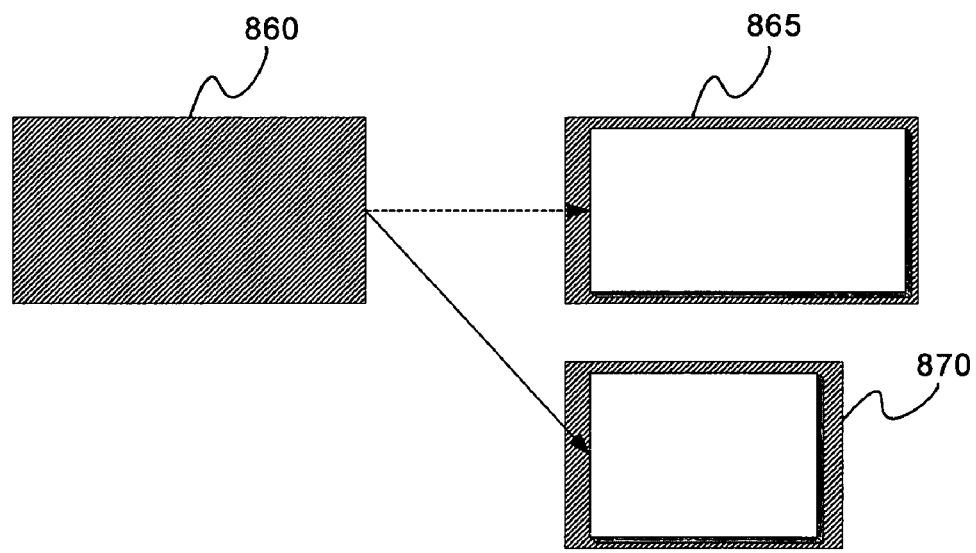
FIG. 8b illustrates an exemplary MPEG dual display cropping, in accordance with an embodiment of the present invention.

FIG. 8b illustrates an exemplary MPEG dual display cropping, in accordance with an embodiment of the present invention. In this exemplary situation, the SD output 870 may be cropped for pan-scan, where the cropping may occur at the scaler 825. The HD output 865 may be displayed on full screen. The MPEG Dual display configuration of FIG. 8a may assume, for cropping, that video viewed on the primary HD display 865 may be the same as displayed on the secondary SD display 870. The source feed from the MPEG feeder may send the same pixels to both outputs. The input to the scaler may be cropped to a sub-portion of the HD image, and may be displayed full screen on the SD display. The scaler may include a line buffer to absorb the burstiness of the input. The SD scaler input may become burstier to avoid violating the constant feed rate to the HD scaler.

Figure 8C:
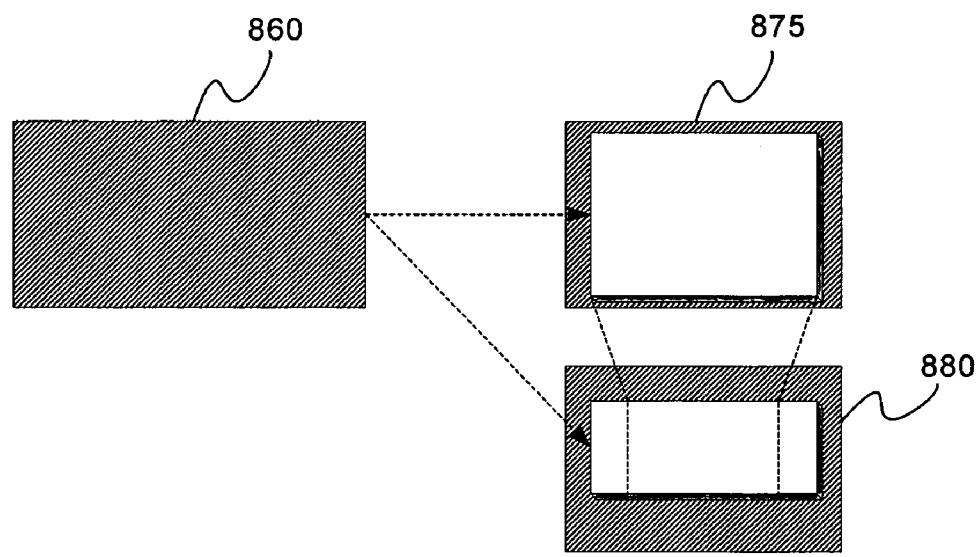
FIG. 8c illustrates another exemplary MPEG dual display cropping, in accordance with an embodiment of the present invention.

FIG. 8c illustrates another exemplary MPEG dual display cropping, in accordance with an embodiment of the present invention. In this exemplary situation, the HD output 875 may be cropped for pan-scan, the cropping may occur at the scaler 810. The SD output 880 may be displayed on full screen. In this case, a large number of pixels may be fed from the MPEG feeder to both scalers around the sides of the picture. About 1/4 of the screen may be fed out and discarded by the HD scaler. These pixels may be fed from the MPEG Feeder to the SD scaler, and accepted by the SD scaler within the horizontal blank time of the HD image.

In an embodiment of the present invention, data rates in a dual output-single video source system such as, for example, that illustrated in FIG. 8a, may be managed by matching the worst-case data rate and ensuring the rate for video capture is sufficient to guarantee no stalls in the live output on both displays. As a result, multiple video displays from a single source may be allowed in a memory bandwidth-efficient manner. In an embodiment of the present invention, N video outputs from a single source may be managed, where N−1 video outputs may be sent to a capture engine. A capture engine may ensure that each of the N−1 video outputs maintains sufficient bandwidth.

Figure 9:
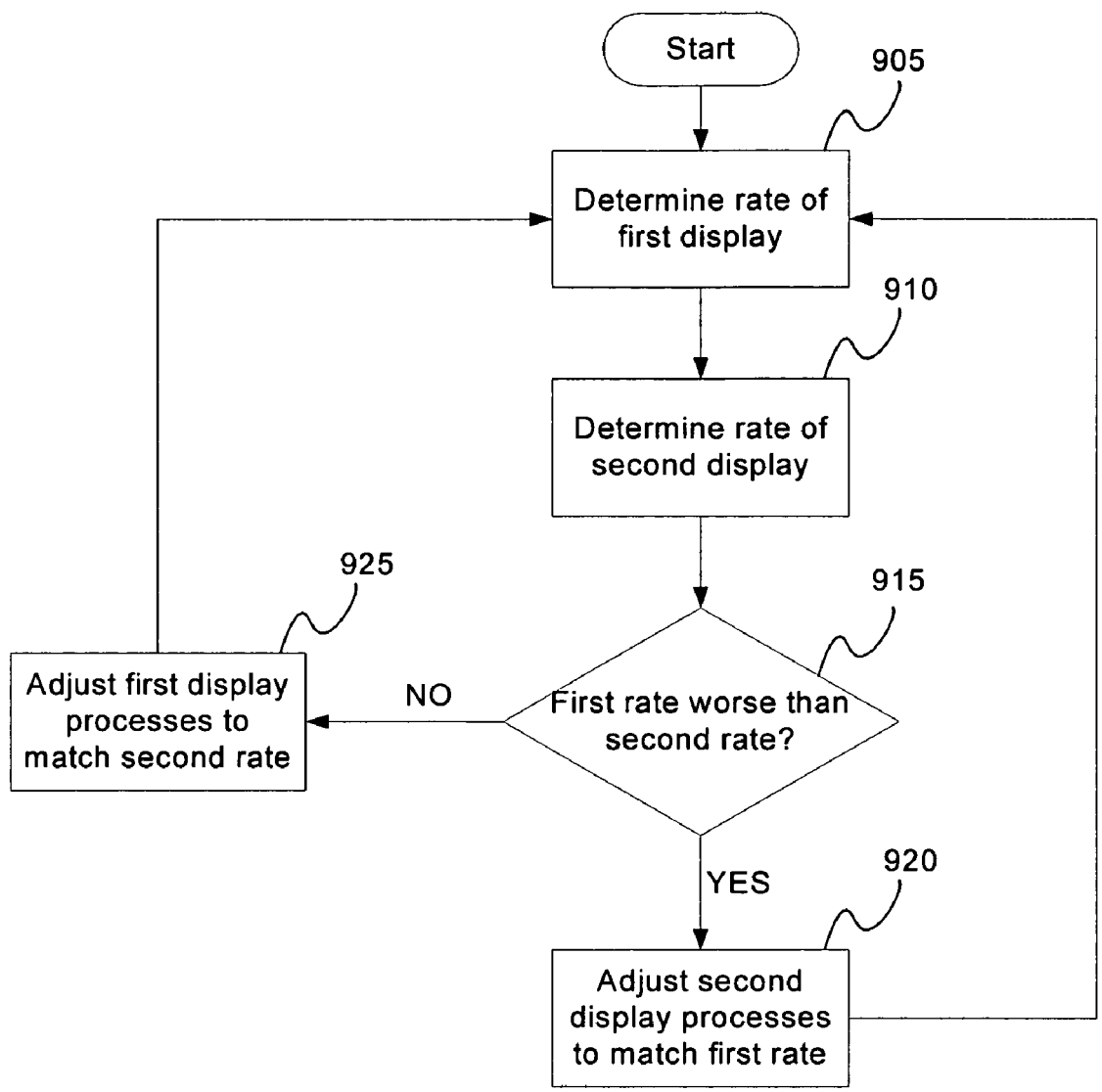
FIG. 9 illustrates a flow chart of an exemplary method for analyzing multiple display data rates in a video system, in accordance with an embodiment of the present invention.

FIG. 9 illustrates a flow chart of an exemplary method for analyzing multiple display data rates in a video system, in accordance with an embodiment of the present invention. The video system may comprise one input source and multiple output displays such as, for example, two displays. The data rate associated with the first output display may be determined at 905. The data rate associated with the second output display may also be determined at 910. The two data rates may then be compared at 915, and if the first data rate is worse than the second data rate, the processing associated with the second output display may be adjust at 920. If the second data rate is worse than the first data rate, the processing associated with the first output display may be adjust adjusted at 925. The method may start again when changes occur in either output displays, or the input changes.

Determining the data rate of each of the output displays may involve analyzing the input source and the output display, and any processes that may occur between the input and the output. The display with the worse data rate may control the display and the rate of the entire system. Therefore, to avoid problems in displaying video on the other output display in the system, the processing associated with the other output display may be adjusted such that the data rate associated with it matches the other data rate. This may ensure that both displays and any processing associated therewith may not halt or cause a system failure.

In analyzing the system and the rates such as, for example, in the case of the two displays of FIG. 8a, the rates of the processes associated with each display may be analyzed as well. For example, when the input comes from the feeder 805, and is scaled at 825, the data rate may be affected by the scale factor, but may still need to match the rate at which data need be captured 830 to be stored in memory. Adjustment may then be made to the video feeder 835 to ensure that after the scaling, with a fixed storing rate at the capture 830, the rate at which it may be played out of memory matches such that system failures do not occur. As a result, in the case where there may be scaling, capturing, then video feeding, analysis may be done from both sides of the capture block 830, to ensure that up to the capture block the data rate is appropriate while ensuring the rate at 850 matches the rate at 855. Additionally, analysis may be done on the other side of the capture block 830 to ensure the data rate between the capture block 830 and the display 845 is appropriate at both end, where the data is read from memory and the rate at which the data is displayed.

To illustrate, for example, assume a system comprising a video feeder is producing video at a particular sample rate (S) and the system also has a burst time, which is essentially the active video time on a line (active), in the line time (line). The triplet {S, active, line} describes the video from a data rate perspective, which may indicate that there is a line time of video (line), there is an active period within this line and within that active period (active), and pixels are coming at a particular sample rate (S). For example, for SD, S is 13.5 megapixels per second, and for HD it's 74.25 megapixels per second. If the pixels during the active time run through a buffer, a buffer of a particular size may be used so that the active time and the line time become the same. Where the buffer would fill during the active period and empty during this blanking period, which is the period remaining on the line other than the active period. As a result, when a new line starts again, the buffer is empty. Using this analysis, the optimal depth of the buffer may be computed, if the fill rate and the line rate are known, and those correspond to the data rate before and after the buffer. A buffer therefore may be utilized between processes in the system to ensure, for example, that the data coming out of memory displays properly on an output display. Therefore the buffer filling and emptying rates may be adjusted to ensure a smooth and continuous data flow between memory and display.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling video data, the method comprising:
determining data rates associated with each of a plurality of destination devices utilized for processing the video data in a video processing system that supports multiple display data rates, wherein a first destination device of said plurality of destination devices is associated with a first data rate and a second destination device of said plurality of destination devices is associated with a second data rate;
comparing said first and second data rates; and
responsive to said comparison, adjusting a processing portion associated with said first destination device to match said second data rate if said second data rate is slower than said first data rate, otherwise adjusting a processing portion associated with said second destination device to match said first data rate if said first data rate is slower than said second data rate.

2. The method according to claim 1, wherein the plurality of destination devices receives input video data from a single source.

3. The method according to claim 2, further comprising:
capturing the input video data at a first capture rate; and
capturing the input video data at a second capture rate, wherein the first capture rate and the second capture rate ensure that the first data rate matches the at least second data rate.

4. The method according to claim 1, wherein the first destination device or the at least second destination device comprises at least one video display.

5. The method according to claim 1, wherein the first destination device or the at least second destination device comprises memory.

6. The method according to claim 1, wherein the processing of the video data in the video processing system comprises at least one of:
scaling, compositing, capturing to memory, and video feeding.

7. The method of claim 1, wherein the plurality of destination devices receives input video data from a single source and display the entire content of the input video data from the single source.

8. The method of claim 1, wherein the plurality of destination devices display the same images.

9. A system for handling video data in a video system, the system comprising:

at least one processor configured to determine data rates associated with each of a plurality of destination devices utilized for processing the video data in a video processing system that supports multiple display data rates, wherein a first destination device of said plurality of destination devices is associated with a first data rate and a second destination device of said plurality of destination devices is associated with a second data rate; and the at least one processor is configured to:

compare said first and second data rates; and adjust processing portion associated with said first destination device to match said second data rate if said second data rate is slower than said first data rate, otherwise adjust a processing portion associated with said second destination device to match said first data rate if said first data rate is slower than said second data rate.

10. The system according to claim 9 wherein the plurality of destination devices receive input video data from a single source.

11. The system according to claim 10, wherein said at least one processor is configured to:

capture the input video data at a first capture rate; and capture the input video data at a second capture rate, wherein the first capture rate and the second capture rate ensure that the first data rate matches the at least second data rate.

12. The system according to claim 9, wherein the first destination device or the at least second destination device comprises at least one video display.

13. The system according to claim 9, wherein the first destination device or the at least second destination device comprises memory.

14. The system according to claim 9, wherein the processing of the video data in the video processing system comprises at least one of scaling, compositing, capturing to memory, and video feeding.

15. The system of claim 9, wherein the plurality of destination devices receives input video data from a single source and display the entire content of the input video data from the single source.

16. The system of claim 9, wherein the plurality of destination devices display the same images.

17. A non-transitory machine-readable storage having stored thereon, a computer program having at least one code section for handling video data in a video system, the at least one code section being executable by a machine for causing the machine to perform steps comprising:

determining data rates associated with each of a plurality of destination devices utilized for processing the video data in a video processing system that supports multiple display data rates, wherein a first destination device of said plurality of destination devices is associated with a first data rate and a second destination device of said plurality of destination devices is associated with a second data rate;

comparing said first and second data rates; and responsive to said comparison, adjusting a processing portion associated with said first destination device to match said second data rate if said second data rate is slower than said first data rate, otherwise adjusting a processing portion associated with said second destination device to match said first data rate if said first data rate is slower than said second data rate.

18. The non-transitory machine-readable storage according to claim 17, wherein the plurality of destination devices receive input video data from a single source.

19. The non-transitory machine-readable storage according to claim 18, further comprising:

code for capturing the input video data at a first capture rate; and code for capturing the input video data at a second capture rate, wherein the first capture rate and the second capture rate ensure that the first data rate matches the at least second data rate.

20. The non-transitory machine-readable storage according to claim 17, wherein the first destination device or the at least second destination device comprises at least one video display.

21. The non-transitory machine-readable storage according to claim 17, wherein the first destination device or the at least second destination device comprises memory.

22. The non-transitory machine-readable storage according to claim 17, wherein the processing of the video data in the video processing system comprises at least one of:

scaling, compositing, capturing to memory, and video feeding.

23. The non-transitory computer-readable medium of claim 17, wherein the plurality of destination devices receives input video data from a single source and display the entire content of the input video data from the single source.

24. The non-transitory computer-readable medium of claim 17, wherein the plurality of destination devices display the same images.

* * * * *

UNITED STATES PATENT AND TRADEMARK OFFICE
CERTIFICATE OF CORRECTION

| | |
|---|---|
| PATENT NO. | : 8,275,031 B2 |
| APPLICATION NO. | : 11/304281 |
| DATED | : September 25, 2012 |
| INVENTOR(S) | : Darren Neuman |

It is certified that error appears in the above-identified patent and that said Letters Patent is hereby corrected as shown below:

In the Claims

Column 13, line 14, after the word "adjust", insert the word --a--.

Signed and Sealed this
Twenty-fourth Day of December, 2013

Margaret A. Focarino
*Commissioner for Patents of the United States Patent and Trademark Office*